US006549703B1

(12) United States Patent
Tanielian et al.

(10) Patent No.: US 6,549,703 B1
(45) Date of Patent: Apr. 15, 2003

(54) HIGH BANDWIDTH, COMPACT N×N OPTICAL SWITCH

(75) Inventors: Minas Tanielian, Bellevue, WA (US); Michael J. LaGasse, Nutting Lake, MA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/577,279

(22) Filed: May 23, 2000

(51) Int. Cl.[7] .............................. G02B 6/32; G02B 6/35; G02B 7/02
(52) U.S. Cl. .............................. 385/33; 385/16; 385/93; 359/210; 359/813; 359/821
(58) Field of Search .............................. 385/16–25, 31, 385/33, 35, 39, 40, 88, 92, 93, 94, 119; 359/210, 664, 722, 738, 808, 809, 811, 813, 814, 821, 822–824

(56) References Cited

U.S. PATENT DOCUMENTS

| 4,521,854 A | * | 6/1985 | Rhim et al. ................. 117/901 |
| 4,696,062 A | | 9/1987 | LaBudde ..................... 455/612 |
| 4,989,941 A | | 2/1991 | Soref ........................... 350/96 |
| 5,208,880 A | | 5/1993 | Riza et al. ..................... 385/18 |
| 5,271,075 A | | 12/1993 | Gfeller et al. ................ 385/20 |
| 5,436,986 A | | 7/1995 | Tsai ............................. 385/16 |
| 5,440,654 A | | 8/1995 | Lambert ...................... 385/17 |
| 5,699,463 A | | 12/1997 | Yang et al. ................... 385/22 |
| 5,867,617 A | | 2/1999 | Pan et al. ..................... 385/18 |
| 5,963,682 A | | 10/1999 | Dorschner et al. ............ 385/16 |
| 6,253,001 B1 | * | 6/2001 | Hoen ........................... 385/16 |
| 6,320,998 B1 | * | 11/2001 | Okayama et al. ............. 385/16 |

FOREIGN PATENT DOCUMENTS

| EP | 741494 A2 | * | 11/1996 | .......... H04N/5/232 |
| JP | 04013231 A | * | 1/1992 | ............ G11B/7/09 |

OTHER PUBLICATIONS

"Speeding up the Fiber–Optic Highway," The New York Times Oct. 28, 1999, p. D13, by Lisa Guernsey.

* cited by examiner

Primary Examiner—Akm E. Ullah
Assistant Examiner—Michelle R. Connelly-Cushwa
(74) Attorney, Agent, or Firm—Conrad O. Gardner

(57) ABSTRACT

Electrostatic levitation and positioning of a charged, spherical micro-lens to steer an optical beam from a transmit fiber to a receive lens/fiber pair. Bundled arrays of N fibers and lenses provide a switch having a switch count that scales linearly in the port count N.

2 Claims, 7 Drawing Sheets

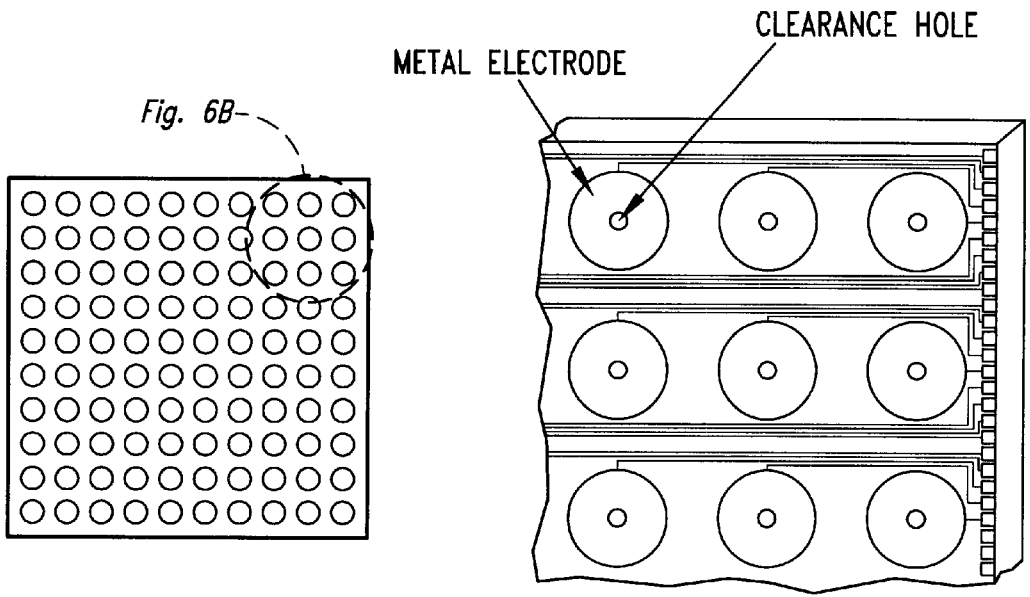
Fig. 6A
Fig. 6B
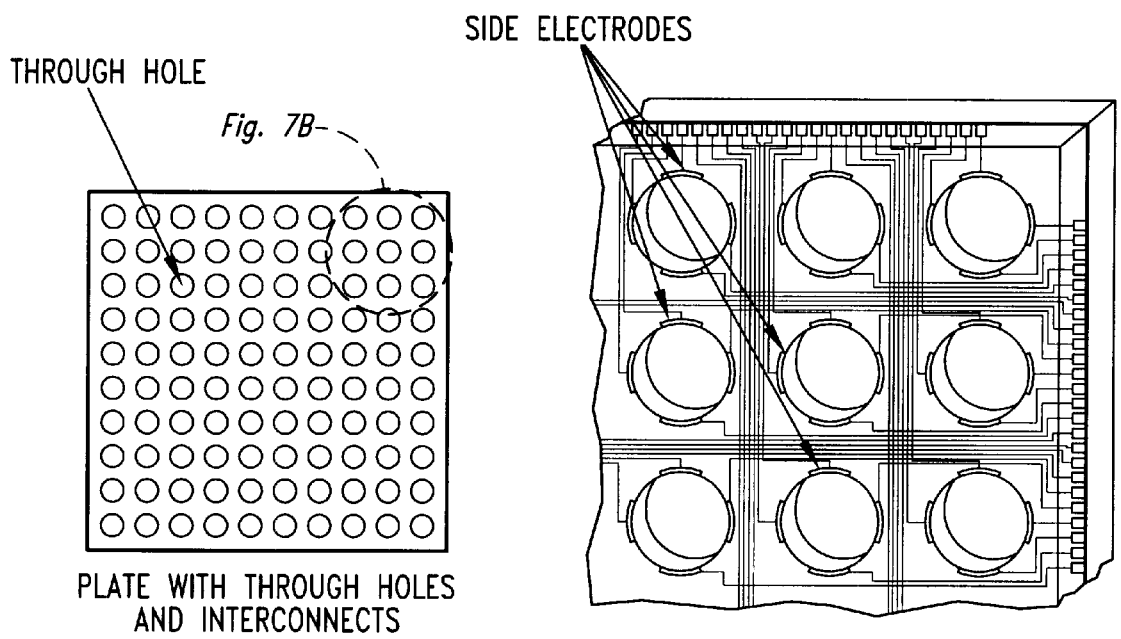
PLATE WITH THROUGH HOLES
AND INTERCONNECTS
Fig. 7A
Fig. 7B

CHAMBER WITH LENS

HIGH BANDWIDTH, COMPACT N×N OPTICAL SWITCH

TECHNICAL FIELD

This invention relates to laser scanning and switching in arrays having large port counts.

BACKGROUND OF THE INVENTION

Currently, most optical switching is either done by converting the signals into electrical signals, switching, and then back to optical signals or by using MEMS mirrors, or by optoelectronic switches fabricated on lithium niobate. Each of these approaches is either expensive, bulky or complex. 16×16 switches have been constructed with small volumes, however, the loss was high, and the approach does not scale to larger switch ports. There have been approaches proposed that reduce the scaling from N^2 to NLOG2(N). However, the trade was an extremely large size: a few meters long for a 64×64.

A common configuration for an optical switch is N input fiber ports and N output fiber ports where N is an integer. This configuration is referred to as an N×N optical switch, and it is constructed of approximately N^2 individual (1×2) switches. For example, a 16×16 has 16 input fibers and 16 output fibers. The problem with the standard approach is that the number of switches increases rapidly as the number of ports, N is increased. The number of switches scales as N^2, and the complexity of the N×N switch increases very rapidly. This has prevented large scale, low loss N×N switches from being manufacturable in a small package. Commercially available switches with a size of 32×32 or larger, are large, rack mounted systems. 16×16 switches have been fabricated using integrated optical approaches such as lithium niobate or glass, however they have relatively high loss, and it is not feasible to scale them to larger size with low loss.

BRIEF SUMMARY OF THE INVENTION

The present invention relates to a method and a device that allows for switching N by N optical paths, each path being non-blocking; an optical switch where the various optical beams are steered by movement of their corresponding lenses. An optical switch is much more compact, lighter and dissipates less power compared to an electrical switch. The optical switch also can route orders of magnitude higher data rate signals. Moreover, all optical-to-optical switches currently under development employ reflective surfaces, such as MEMS micro-mirrors. In contrast, the present invention uses a refractive approach, where the laser beam is scanned using moving lenses.

The present switch has a much improved scalability compared to other approaches. The number of individual switches required scales linearly in the port count N. This permits an extremely large port count with N×N exceeding 1000×1000.

BRIEF DESCRIPTION OF THE SEVERAL VIEWS OF THE DRAWINGS

FIG. 6A shows the top plate configuration with the electrodes, which control the z-axis;

FIG. 6B shows the bottom plate configuration with the electrodes, which control the z-axis;

FIG. 7A is a schematic drawing of the middle section of the lens housing (top view) showing the plate with through holes and interconnects;

FIG. 7B shows side electrodes of FIG. 7A in more detail;

DETAILED DESCRIPTION OF THE INVENTION

1. Scaling Complexity Issues

There are emerging system applications that require large scale optical interconnects. Commercial applications such as telecommunication switching require large numbers of ports. A recent trade study and survey of possible solutions were disappointing in that the approaches available could not address the system requirements. Table 1 summarizes some results from published switch arrays with port counts of 8×8 and larger. Generally, the approaches have a complexity (number of switches) that scales as $N^2$. However, the situation is even worse when the details of the fabrication process are considered. The approaches typically employ planar structures with limitations from aligning large fiber arrays and potential issues relating to thermal expansion mismatches between the different material systems. Other issues include yield and reliability as the switch is operated over millions of cycles.

TABLE 1

Published Data on Various Optical Switch Arrays

| TECHNOLOGY | SWITCH SIZE | INSERTION LOSS | PMD | SCALING DIFFICULTY | SPEED | SIZE | COMMENTS |
|---|---|---|---|---|---|---|---|
| Thermo-optic Glass | 16 × 16 | <10 dB | Low | >N^2 | ~1 ms | mall volume/ planar | 8 × 8 commercially available |
| Polymer | 8 × 8 | 0.7 (average) | Low | >N^2 | Ms | mall volume/ planar | |
| Lithium Niobate | 8 × 8 | <10 dB | High | >N^2 | ~1 micro sec | Moderate volume/ planar | High speed |
| Semiconductor | 8 × 8 | 17–25 dB | Low | >N^2 | ~1 micro sec | Moderate volume/ planar | High speed |
| MEMS | 16 × 16 | 10 dB? | Low | >N^2 | 1–10 ms | mall volume/ planar | Reliability of irrors, yields? |
| Moving Lens | >100 × 100 | 5 db estimate | Low | N | <1 ms | Extremely compact/3D | Compact large scale arrays possible |

The hereinafter described moving lens system is shown on the bottom line of the table. The present system is unique in providing a scaling difficulty that scales linearly in N. This feature is leveraged to give the smallest possible footprint and the largest number of ports. Based on the hereinafter described high-yield manufacturing process, scaling to switches larger than 100×100 is expected, with switching cycles exceeding $10^9$.

2. Conventional Approach for Creating Larger Count Switch Arrays

Figure 1:
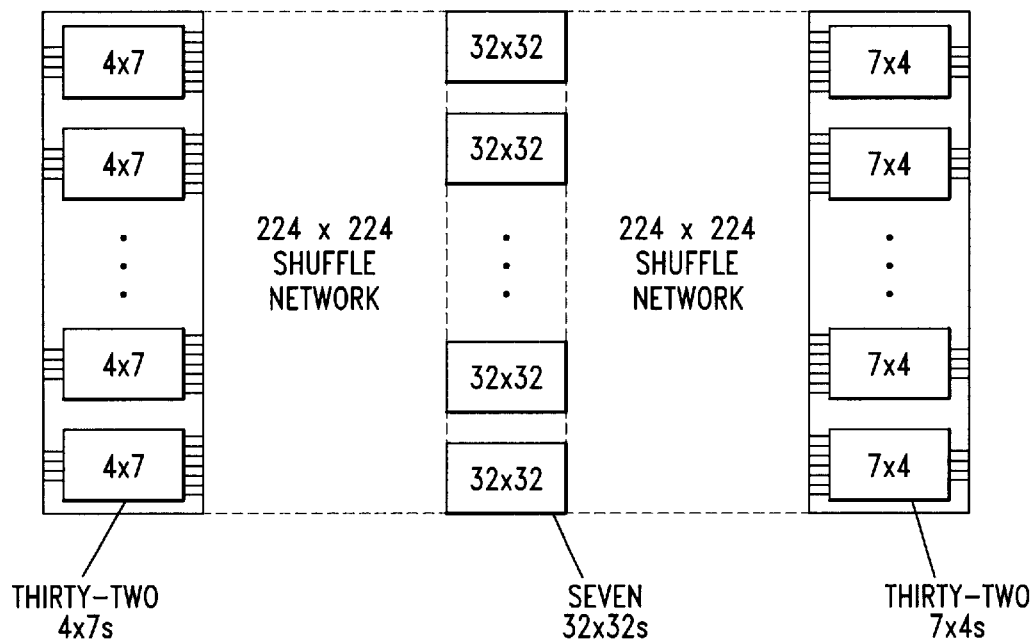
FIG. 1 is illustrative of a conventional approach used to create a 128×128 switch array.

With availability of a 32×32 switch module, a procedure can be used to create a larger nonblocking switch array. FIG. 1 shows an example of interconnecting seven 32×32 and sixty-four 7×4 switch arrays to achieve a nonblocking switch array with a port count of 128×128. The 224×224 is an optical "shuffle network" from fiber or waveguides on glass substrates. To achieve this in a low-loss and reliable package may not be practical.

Technical Approach

1. Interconnection Approach

Figure 2:
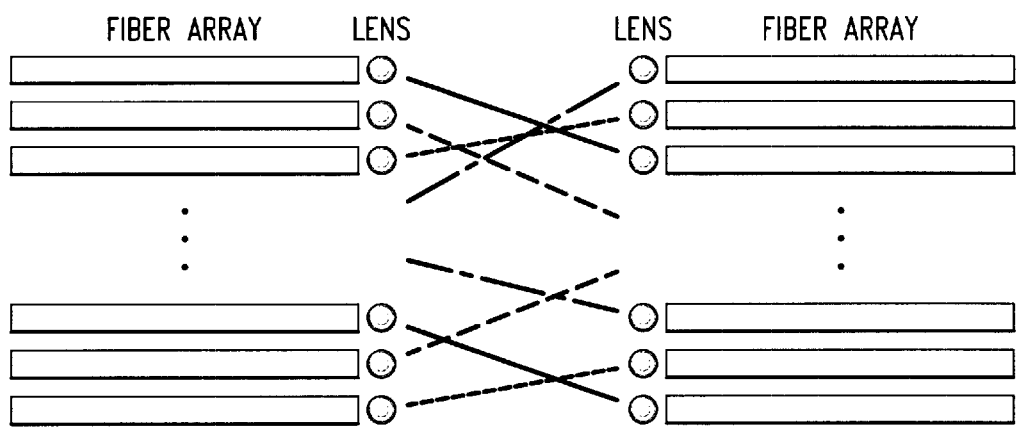
FIG. 2 is illustrative of the present switching with two 1-D arrays.
Figure 3A:
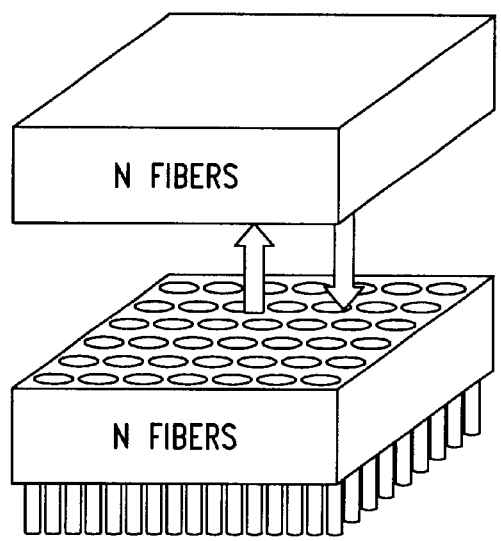
FIG. 3A is illustrative of the present switching using two 2-D arrays.
Figure 3B:
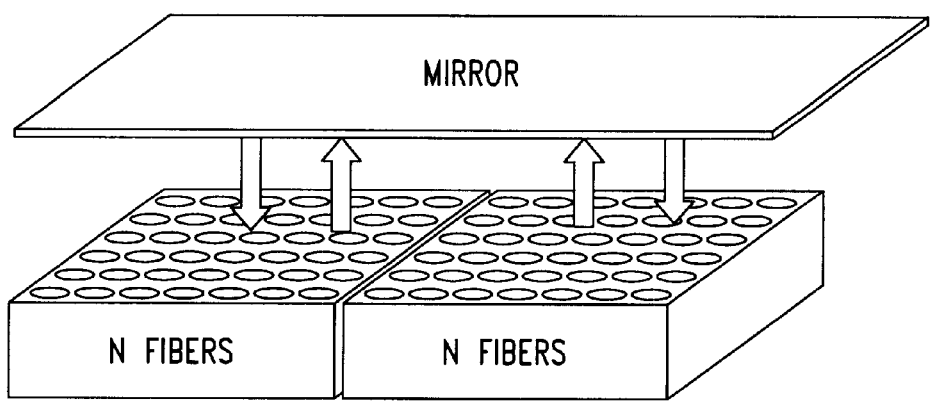
FIG. 3B shows folding of the arrays for achieving increased compactness.

FIG. 2 shows a linear fiber array to illustrate the present interconnection feature. The lenses collimate and point the beam to a designated receive lens/fiber pair. The fiber array is scaled in 3-D to a bundle, which gives the smallest possible footprint for the optical switch. FIG. 3A shows the concept for the 3-D fiber array, including an approach shown in FIG. 3B where the geometry is folded using a mirror for a compact footprint. The region between the fiber and the mirror can be a glass block to achieve a rigid, stable package.

2. Levitation Approach

Figure 4:
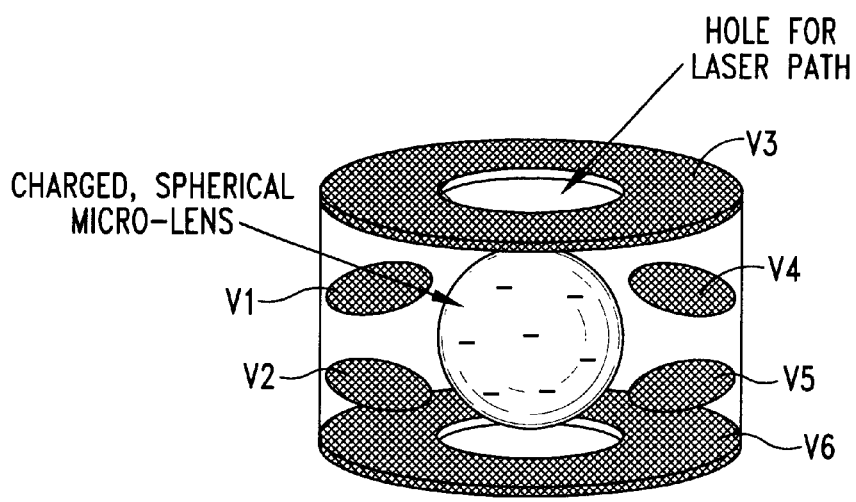
FIG. 4 is a schematic drawing of the cage in which the micro-lens is confined.
Figure 5:
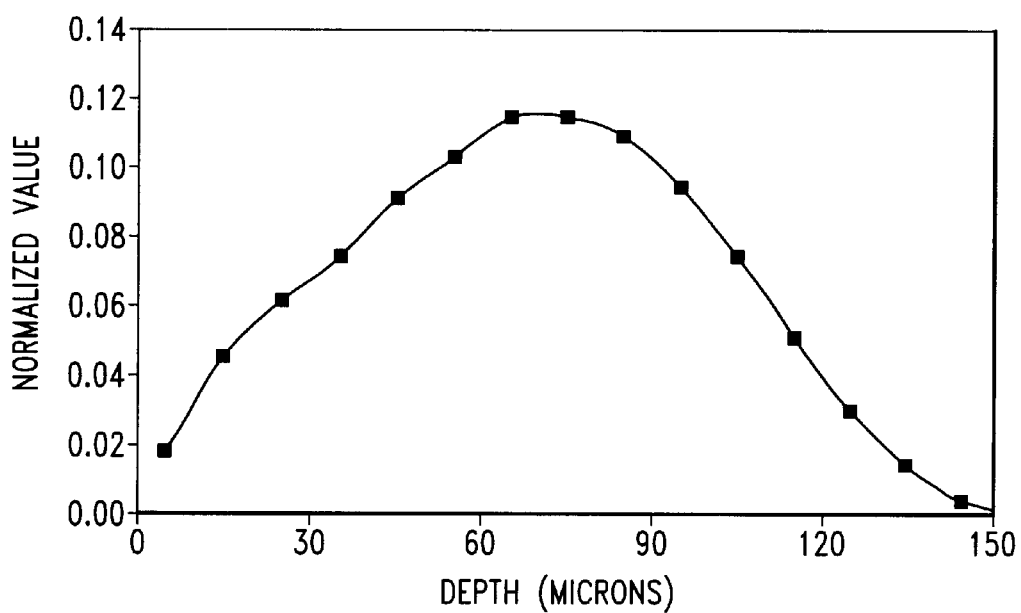
FIG. 5 is a graph showing charge deposition in $SiO_2$ for a 150 KeV source.

The approach for beam steering and focusing uses spherical micro-lenses, which are electrostatically levitated and positioned. The levitation is accomplished by applying voltage to a number of control electrodes in a small "cage" structure as shown schematically in FIG. 4. The spherical micro-lens can be charged using various high-energy electron sources such as a SEM, TEM or any electron accelerator with enough energy such that the range of the electrons is approximately the center of the sphere. FIG. 5 shows an energy-range relationship for electrons with an incident energy of 150 KeV in $SiO_2$. Typically, electrons injected into a good dielectric such as $SiO_2$ go into deep traps, which are very stable, thus imparting a net charge in the dielectric. These classes of materials are known as electrets.

3. Fabrication Approach

The N×N switch is essentially made of three structural elements: the fiber bundles, the micro-lens housing, and the overall switch housing. The following describes the fabrication of each one of these elements.

3.1. Fabrication of the Micro-Lens Housing Array

The micro-lens housing array is made of two elements. The first element is used to form the top and bottom electrode arrays and the second element is used in two segments that make the middle array pattern, which confines the micro-lens in the x-y plane. A schematic drawing of the first element, which serves as the top or bottom segment is shown in FIGS. 6A and 6B (detail), is comprised of a part made of glass or ceramic and has a thin film deposited, photolithographically patterned array of electrodes on it. These electrodes are used to levitate/control the spherical micro-lens in the z-direction. The electrode has a clearance hole in its middle, so that the laser beam can pass through this top/bottom sections, unimpeded. The hole is formed using laser drilling, after the fabrication of the electrodes and interconnects is done.

Figure 7C:
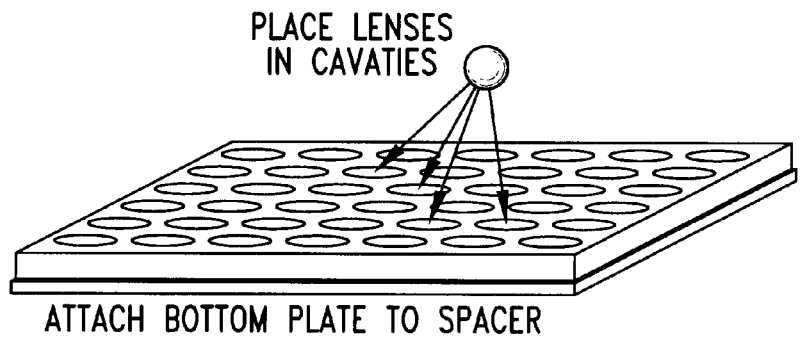
FIG. 7C is illustrative of a method step in the assembly process where the lenses are placed in the cavities and attachment of the bottom plate to the spacer.

The second element of the housing is used to levitate/control the micro-lens in the x-y plane. The reason it is made of two segments is because (a) this allows to locate half of the interconnections on each segment, which simplifies fabrication, and (b) when the two segments are bonded together (with the interconnections facing each other), the side-controlling electrodes become located midway between the top and bottom of the array. This makes the electrode configuration symmetrical about he mid-point of the micro-lens enclosure (cage) and thus simplifies somewhat the control algorithms (not shown). This element can also be made of glass or ceramic and the electrode configuration can be done using standard thin film techniques. After the fabrication and patterning step, holes are formed on the substrate using either laser drilling or ultrasonic machining. Finally, the two plates are brought together and bonded. This creates the cylindrical volume in which the micro-lens is confined in the x-y plane. A schematic of this assembled part is shown in FIG. 7A (top view) with side electrodes shown in more detail in FIG. 7B.

Figure 7D:
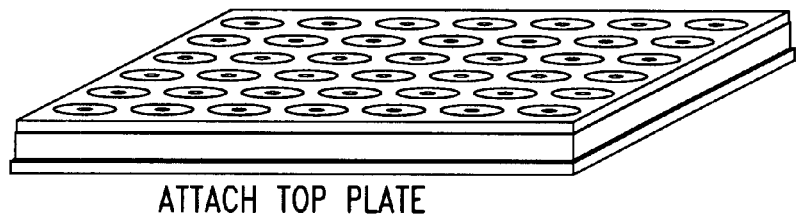
FIG. 7D shows attachment of the top plate.
Figure 7E:
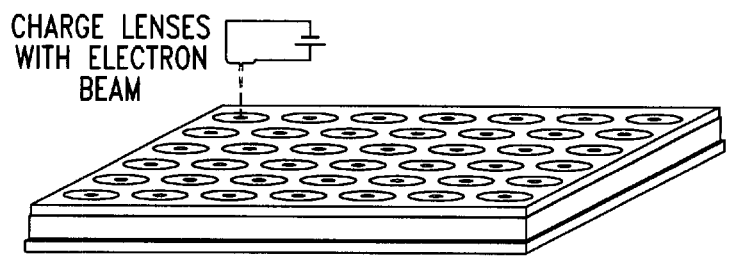
FIG. 7E is further illustrative of the packaging assembly process of the total system where the lenses are charged with an electron beam.

Next, the middle section is assembled with the bottom section (FIG. 7C), thus forming a set of cylindrical cavities, where the spherical micro-lenses can be placed. The final assembly step is to add the top section (FIG. 7D), thus creating an enclosure that confines the micro-lens. This is followed by a charge injection step (FIG. 7E), during which time the micro-lens is converted to an electret. The whole assembly is subsequently heated to eliminate the loosely bound charges from all surfaces of interest. Alternatively, the spherical micro-lenses can be charged prior to their placement in step 7C, thus eliminating step 7E.

4. Packaging Assembly of the Total System

Figure 8A:
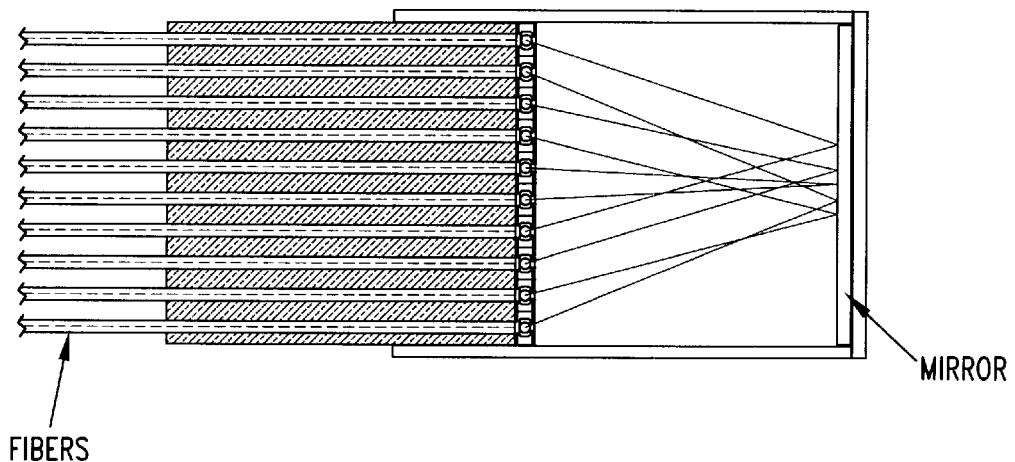
FIG. 8A is a diagram showing packaging of the assembly.
Figure 8B:
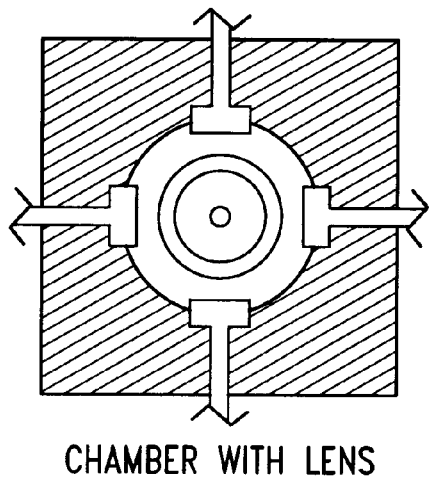
FIG. 8B shows a top view of the chamber with lens utilized in the assembly shown in FIG. 8A.
Figure 8C:
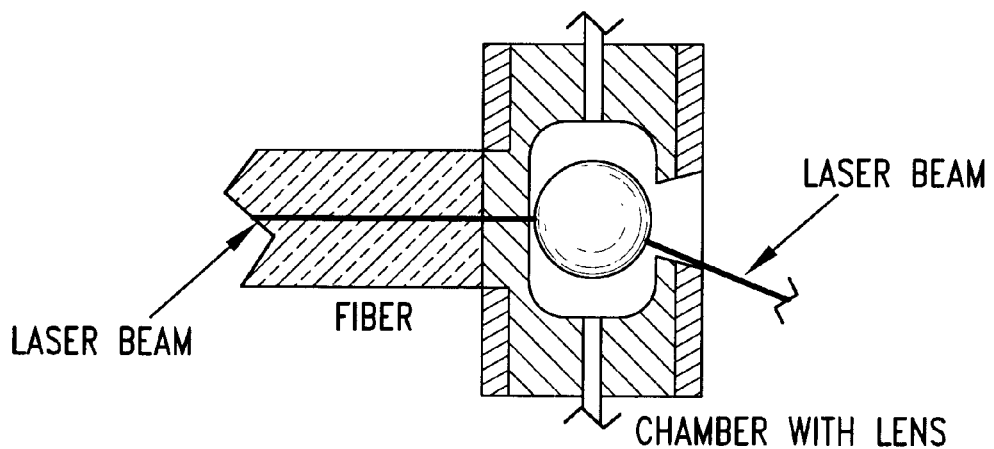
FIG. 8C is a detailed expanded side view showing chamber with lens and optical fiber as utilized in the final assembly of FIG. 8A merging the fiber bundles and the micro-lens array.

The final assembly merges the fiber bundles and the micro-lens array, and fixes the relative location of the transmit and receive arrays. As mentioned before, this can be done by having the two arrays face each other or by folding the array in half and having a mirror at one end. The space between the arrays would be free space. It is clear that the final package would have to be enclosed so that all parts are kept clean and free of contamination. A conceptual drawing of this arrangement is shown in FIG. 8A, a top view of a lens chamber in FIG. 8B and a side view of the lens chamber in FIG. 8C.

5. Micro-Lens Positioning Control Methodology

There is a well-known theorem in electrostatics (Earnshow's theorem) which states that one cannot form a stable potential well by just using electrostatic forces. With the present micro-lens, in addition to the electrostatic forces there is also the force of gravity. Although this does change the problem and furthermore there is not a point charge but rather a distribution of charge and it is unlikely that one could easily achieve stable equilibrium through any combination of electrostatic forces. It is apparent that equilibrium would have to be dynamic through utilization of a control algorithm, which adjusts the forces on the micro-lens through a measurement and feedback process. In the present case, control can be achieved by measuring the relative capacitance and the capacitance change of the electrode configuration due to the movements of the micro-lens. Another approach is by calibrating the position of the micro-lens by applying known potentials to the various electrodes. Since the micro-lens is electrically charged it will induce an image charge on the bottom plate and will be attached to it in the absence of any applied potential. This, then, will become the reference point for further movements. The position of the sphere can be precisely controlled in three dimensions using the side electrodes (xy-axis) and the top/bottom plate electrodes (z-axis). Gravity forces will also be negated by this electrode array.

A fairly simple control algorithm using Proportional, Integral, and Derivative (PID) position feedback will probably be adequate to achieve the desired roughly kHz control bandwidth. Feed-forward control may also be used to cancel known disturbances (e.g., gravity), and to also cancel any non-linearities or sphere forces not related to electrode potential.

We claim:

1. A micro-lens housing array comprising in combination:

top and bottom electrode arrays; and a middle array pattern comprising two elements;

said middle array pattern confining charged spherical micro-lenses in the x-y plane; and said top and bottom electrode arrays levitating and controlling the micro-lenses in the z-direction.

2. The method of fabricating a micro-lens housing array comprising the steps of:

providing a first element for forming top and bottom electrode arrays;

providing a second element for forming a middle array pattern, which confines micro-lenses in the x-y planes;

depositing a thin film photolithographically patterned array of electrodes on said first element for levitating and controlling the spherical micro-lenses in the z-direction;

said thin film photolithographically patterned array of electrodes having a middle clearance hole for passing a laser beam unimpeded through the top and bottom of said first elements;

providing a second element for levitating and controlling the micro-lenses in the x-y plane, said second element having two segments for allocation of half of the interconnections on each segment;

bonding said two segments together thereby providing a cylindrical volume in which the micro-lenses are contained in the x-y plane;

providing charge injection for converting the micro-lenses into electrets;

and then merging fiber bundles with the micro-lens array thereby fixing the relative location of the transmit and receive arrays.

\* \* \* \* \*